United States Patent
Hawkins et al.

(10) Patent No.: US 11,159,000 B2
(45) Date of Patent: Oct. 26, 2021

(54) FRONT CONNECTED SWITCHGEAR ASSEMBLY HAVING AN INTEGRATED ARC FLASH VENTING SYSTEM

(71) Applicant: Siemens Industry, Inc., Alpharetta, GA (US)

(72) Inventors: Thomas W. Hawkins, Arlington, TX (US); Rahul Rajvanshi, Irving, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/815,910

(22) Filed: Mar. 11, 2020

(65) Prior Publication Data

US 2021/0288475 A1 Sep. 16, 2021

(51) Int. Cl.
  *H02B 1/56* (2006.01)
  *H02B 13/025* (2006.01)
  *H01H 33/98* (2006.01)
  *H01H 33/04* (2006.01)
  *H01H 33/53* (2006.01)

(52) U.S. Cl.
  CPC .......... *H02B 13/025* (2013.01); *H01H 33/04* (2013.01); *H01H 33/53* (2013.01); *H01H 33/98* (2013.01); *H02B 1/565* (2013.01)

(58) Field of Classification Search
  None
  See application file for complete search history.

(56) References Cited

U.S. PATENT DOCUMENTS

| | | | |
|---|---|---|---|
| 5,710,402 A | 1/1998 | Kambach et al. | |
| 6,407,331 B1 * | 6/2002 | Smith | H02B 13/025 174/17 VA |
| 7,391,597 B2 | 6/2008 | Meeks et al. | |
| 7,598,833 B1 | 10/2009 | Hodges et al. | |
| 7,821,774 B2 | 10/2010 | Josten et al. | |
| 7,952,857 B1 | 5/2011 | Motley et al. | |
| 7,974,078 B2 | 7/2011 | Coomer et al. | |
| 8,242,395 B2 | 8/2012 | Josten et al. | |
| 8,451,589 B2 | 5/2013 | Milovac et al. | |
| 8,482,903 B2 | 7/2013 | Milovac et al. | |
| 8,598,484 B2 | 12/2013 | Engel et al. | |
| 8,648,274 B2 | 2/2014 | Carlson et al. | |
| 8,733,855 B2 | 5/2014 | Josten et al. | |
| 8,791,361 B2 | 7/2014 | Gingrich | |
| 8,821,622 B2 | 9/2014 | Manahan et al. | |

(Continued)

*Primary Examiner* — Courtney L Smith

(57) ABSTRACT

A switchgear assembly is provided with an integrated arc flash venting system. The switchgear assembly comprises a circuit breaker section including an arc flash vent stack having blow open flaps disposed on a switchgear roof to exhaust arc flash gases and contaminants away from a front of the circuit breaker section, towards a rear of the circuit breaker section and a top of the circuit breaker section. The circuit breaker section includes a circuit breaker compartment having a back wall with a back vent opening for the passage of all the arc flash gases and contaminants. The circuit breaker section further includes a bus compartment. All of the arc flash gases and contaminants pass through the back vent opening in the circuit breaker compartment and into the bus compartment which forms a single pathway for channeling all of the arc flash gases and contaminants to the arc flash vent stack.

16 Claims, 7 Drawing Sheets

(56) References Cited

U.S. PATENT DOCUMENTS

| | | |
|---|---|---|
| 8,842,421 B2 | 9/2014 | Gingrich |
| 8,952,252 B2 | 2/2015 | Bugaris et al. |
| 9,302,213 B2 | 4/2016 | Manahan et al. |
| 9,426,907 B2 | 8/2016 | Karandikar et al. |
| 9,438,015 B2 | 9/2016 | Arcos et al. |
| 9,462,710 B2 * | 10/2016 | Karandikar .......... H02B 13/025 |
| 9,472,925 B2 * | 10/2016 | Zende .................. H02B 13/025 |
| 9,531,168 B2 * | 12/2016 | Bugaris .................... H02B 1/38 |
| 9,577,412 B2 | 2/2017 | Prakash et al. |
| 9,653,896 B2 | 5/2017 | Lafond et al. |
| 9,668,385 B2 | 5/2017 | Manahan et al. |
| 9,871,358 B2 | 1/2018 | Pawar et al. |
| 9,966,740 B2 | 5/2018 | Faber et al. |
| 10,014,668 B2 | 7/2018 | Rajauria et al. |
| 10,375,843 B2 * | 8/2019 | Boily .................. H02B 13/025 |
| 10,673,210 B2 * | 6/2020 | Bellows ............... H05K 5/0213 |
| 2007/0097604 A1 | 5/2007 | Bruski et al. |
| 2009/0185333 A1 * | 7/2009 | Coomer ............... H02B 13/025 361/622 |
| 2009/0212022 A1 * | 8/2009 | Josten ................. H02B 13/025 218/157 |

* cited by examiner

FRONT CONNECTED SWITCHGEAR ASSEMBLY HAVING AN INTEGRATED ARC FLASH VENTING SYSTEM

BACKGROUND

1. Field

Aspects of the present invention generally relate to a front connected switchgear assembly having an integrated arc flash venting system.

2. Description of the Related Art

Switchgear and switchboard are general terms which cover metal enclosures housing switching and interrupting devices such as fuses and circuit breakers along with associated control, instrumentation and metering devices. Switchgear and switchboard also house assemblies of these devices with associated buses, interconnections and supporting structures used for distribution of electric power.

There are High Voltage switchgear and switchboards, Medium Voltage switchgear and switchboards, and Low Voltage switchgear and switchboards. This invention is primarily geared towards the Low voltage switchgear and switchboards. Low voltage switchgear and switchboards operate at voltages up to 635 volts and with continuous currents that can exceed 5000 amperes. They are designed to withstand short-circuit currents up to 200,000 amperes.

Typical switchgear is designed to withstand the effects of bolted (non-arcing) faults on the load terminals and this capability is validated during Short-Circuit Current and Short-Time Current Withstand Tests in IEEE Standard C37.20.1, the disclosure of which is incorporated herein by reference.

Customers have the need for Arc Resistant Switchgear that are front accessible (no rear access required for installation and/or operation and/or maintenance) and have high large breaker (Power Circuit Breaker) density. Applications often do not have area available for rear aisles and desire to have all accessibility from the front. Many features needed to be compressed into reduced spaces requiring innovative solutions.

The occurrence of an arcing fault inside the switchgear produces physical phenomena that are different from bolted faults. For example, the energy resulting from an internal arc in air causes a sudden pressure and temperature increase inside the enclosure. Materials involved in or exposed to the arc produce hot decomposition products, both gaseous and particulate, which may be discharged to the outside of the enclosure.

An internal arcing fault can be caused by insulation degradation, insulation, contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates severe mechanical and thermal stress in the equipment which can blow open doors and covers and burn through or fragment the enclosure and/or cause severe injury to an operator who may happen to be nearby.

An arc resistant switchgear qualified to IEEE C37.20.7 is intended to provide an additional degree of protection to the personal performing normal operating duties in proximity to the energized equipment. Accessibility Type 1 arc resistant switchgear has features at the front of the equipment. Accessibility Type 2 arc resistant switchgear has features at the front, sides and rear of the equipment. Accessibility Type 2B provides Type 2 protection with control or instrumentation compartment doors open. An arc resistant switchgear design requires a means to direct the hot decomposition products created by an internal arcing fault away from the front, sides and rear of the equipment and away from personnel.

Therefore, there is a need for a simplified design which enables a switchgear to safely discharge arc gases.

SUMMARY

Briefly described, aspects of the present invention relate to an arc resistant switchgear qualified to IEEE C37.20.7, the disclosure of which is incorporated herein by reference, so it is intended to provide an additional degree of protection to the personal performing normal operating duties in proximity to the energized equipment. Accessibility Type 1 arc resistant switchgear has features at the front of the equipment. Accessibility Type 2 Arc Resistant switchgear has features at the front, sides and rear of the equipment. Accessibility Type 2B provides Type 2 protection with control or instrumentation compartment doors open. This platform, 'Front Connected Switchgear' has the shallowest section depth in the industry. There is a need in arc resistant switchgear design to provide a means to direct the hot decomposition products created by an internal arcing fault away from the front, sides and rear of the equipment and away from personnel. There is a need to keep the section depth of the Front Connected Switchgear same in Arc Resistant construction. It provides an additional degree of protection to any personnel who are performing normal operating duties in proximity to the energized equipment with the auxiliary compartment doors open in the event of an internal arc fault. A vent stack vents any hot decomposition products coming out of an arc resistant switchgear section. The front connected switchgear section depth is minimized. Shallowest section depth in the industry for this switchgear.

In accordance with one illustrative embodiment of the present invention, a switchgear assembly is provided with an integrated arc flash venting system. The switchgear assembly comprises a circuit breaker section having a switchgear roof, a front, a rear and a top. The circuit breaker section includes an arc flash vent stack having blow open flaps disposed on the switchgear roof to exhaust arc flash gases and contaminants away from the front of the circuit breaker section, towards the rear of the circuit breaker section and the top of the circuit breaker section. The circuit breaker section includes a circuit breaker compartment having a back wall forming a back of the circuit breaker compartment. The circuit breaker section includes a back vent opening formed in the back wall for the passage of all the arc flash gases and contaminants. The circuit breaker section includes a bus compartment. All of the arc flash gases and contaminants pass through the back vent opening in the circuit breaker compartment and into the bus compartment wherein the bus compartment forms a single pathway for channeling all of the arc flash gases and contaminants to the arc flash vent stack.

In accordance with one illustrative embodiment of the present invention, a front connected switchgear assembly is provided. It comprises a circuit breaker section having a switchgear roof, a bus compartment, a front, a rear and a top.

The circuit breaker section includes an arc flash vent stack having blow open flaps disposed on the switchgear roof to exhaust arc flash gases and contaminants away from the front connected switchgear assembly. The front connected switchgear assembly includes a cable section having a side wall and a top. The cable section includes one or more lug pads and a side vent panel formed in the side wall for the passage of all the arc flash gases and contaminants. All of the arc flash gases and contaminants pass through the side vent panel in the side wall of the cable section and into the bus compartment wherein the bus compartment forms a single pathway for channeling all of the arc flash gases and contaminants to the arc flash vent stack.

In accordance with one illustrative embodiment of the present invention, a switchgear assembly is provided with an integrated arc flash venting system. It comprises a section having a switchgear roof, a front, a rear and a top. The section includes an arc flash vent stack having blow open flaps disposed on the switchgear roof to exhaust arc flash gases and contaminants away from the front of the section, towards the rear of the section and the top of the section. The section includes a circuit breaker compartment having a back wall forming a back of the circuit breaker compartment. The section includes a back vent opening formed in the back wall for the passage of all the arc flash gases and contaminants. The section includes a bus compartment. All of the arc flash gases and contaminants pass through the back vent opening in the compartment and into the bus compartment wherein the bus compartment forms a single pathway for channeling all of the arc flash gases and contaminants to the arc flash vent stack.

DETAILED DESCRIPTION

Figure 1:
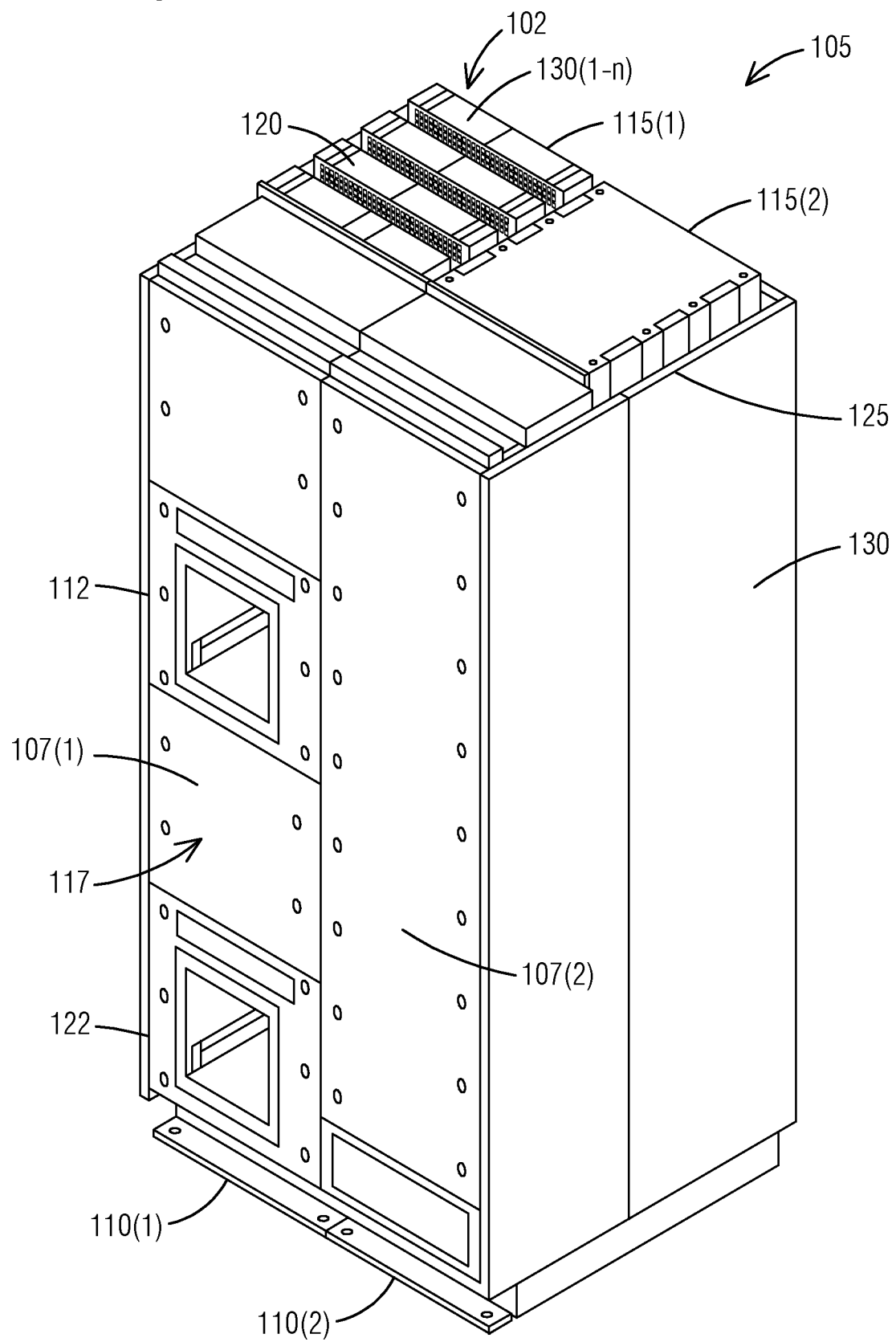
FIG. 1 illustrates a perspective view of a front connected switchgear assembly consisting of multiple switchgear sections including a circuit breaker section and a cable section assembled on respective riser bases in accordance with an exemplary embodiment of the present invention.

To facilitate an understanding of embodiments, principles, and features of the present invention, they are explained hereinafter with reference to implementation in illustrative embodiments. In particular, they are described in the context of a front connected switchgear assembly having an integrated arc flash venting system. The integrated arc flash venting system includes a vent stack over a circuit breaker section. The vent stack includes blow open flaps/pressure flaps which are automatically opened under arc fault conditions while they stay closed under normal operating conditions. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the switchgear having an integrated arc flash venting system according to the present disclosure are described below with reference to FIGS. 1-7 herein. Like reference numerals used in the drawings identify similar or identical elements throughout the several views. The drawings are not necessarily drawn to scale.

Consistent with one embodiment of the present invention, FIG. 1 represents a perspective view of a front connected switchgear assembly 105 consisting of multiple switchgear sections including a circuit breaker section 107(1), and a cable section 107(2) assembled on respective riser bases 110(1-2) in accordance with an exemplary embodiment of the present invention. Each circuit breaker section 107(1) can contain up to four circuit breaker compartments 112 containing one circuit breaker per compartment. The front connected switchgear assembly 105 has an integrated arc flash venting system 102. The integrated arc flash venting system 102 includes an arc flash vent stack 120 over the circuit breaker section 107(1). The vent stack 120 includes a plurality of blow open flaps/pressure flaps 130(1-n) which are automatically opened under arc fault conditions while they stay closed under normal operating conditions. Each section has a ventilation structure 115(1-2) located on top. Each circuit breaker section 107(1) can also contain up to four instrumentation or control compartments 117. The circuit breaker section 107(1) has the vent stack 120 with at least one of the plurality of blow open flaps/pressure flaps 130(1-n). The cable section 107(2) is a load cable connection section. The blow open flaps 130(1-n) of the arc flash vent stack 120 are configured to blow open to relieve pressure from all the arc flash gases and contaminants.

When an arc fault event occurs in the front connected switchgear assembly 105 at the one or more breaker compartment locations gases/plasma then flows through the vent stack 120 of and towards a side and a rear of a low voltage switchgear (see FIG. 2) and towards a top where the gases/plasma are safely discharged to an outside air through the ventilation structure 115(1-2). The ventilation structure 115(1-2) has at least one set of ventilation holes to channel the passage of the arc. The front connected switchgear assembly 105 has at least one equipment compartment 122. The equipment compartment 122 accommodates at least one equipment selected from a group consisting of a circuit breaker, an electronic device, and an electronic module. The ventilation structure 115(1-2) has at least one vent stack 120 for the passage of an arc plasma. The vent stack 120 is located on a switchgear roof 125 of the front connected switchgear assembly 105. The vent stack 120 is secured to the front connected switchgear assembly 105 via at least one securing means (not seen). The circuit breaker section 107(1) having the switchgear roof 125, a front, a rear and a top.

The front connected switchgear assembly 105 comprises an electrical distribution system switchgear cabinet 130 defining a compartment front opening including a compartment front opening periphery. The electrical distribution system switchgear cabinet 130 having a swinging switchgear door for selectively covering the entire compartment front opening when closed against a compartment front opening periphery thereof and providing access to the compartment front opening when opened. The front connected switchgear assembly 105 further comprises first and second side walls, back wall, floor and top cover forming a closed structure about the compartment front opening. The front connected switchgear assembly 105 further comprises a compartment formed within the electrical distribution system switchgear cabinet 130 front opening.

Figure 2:
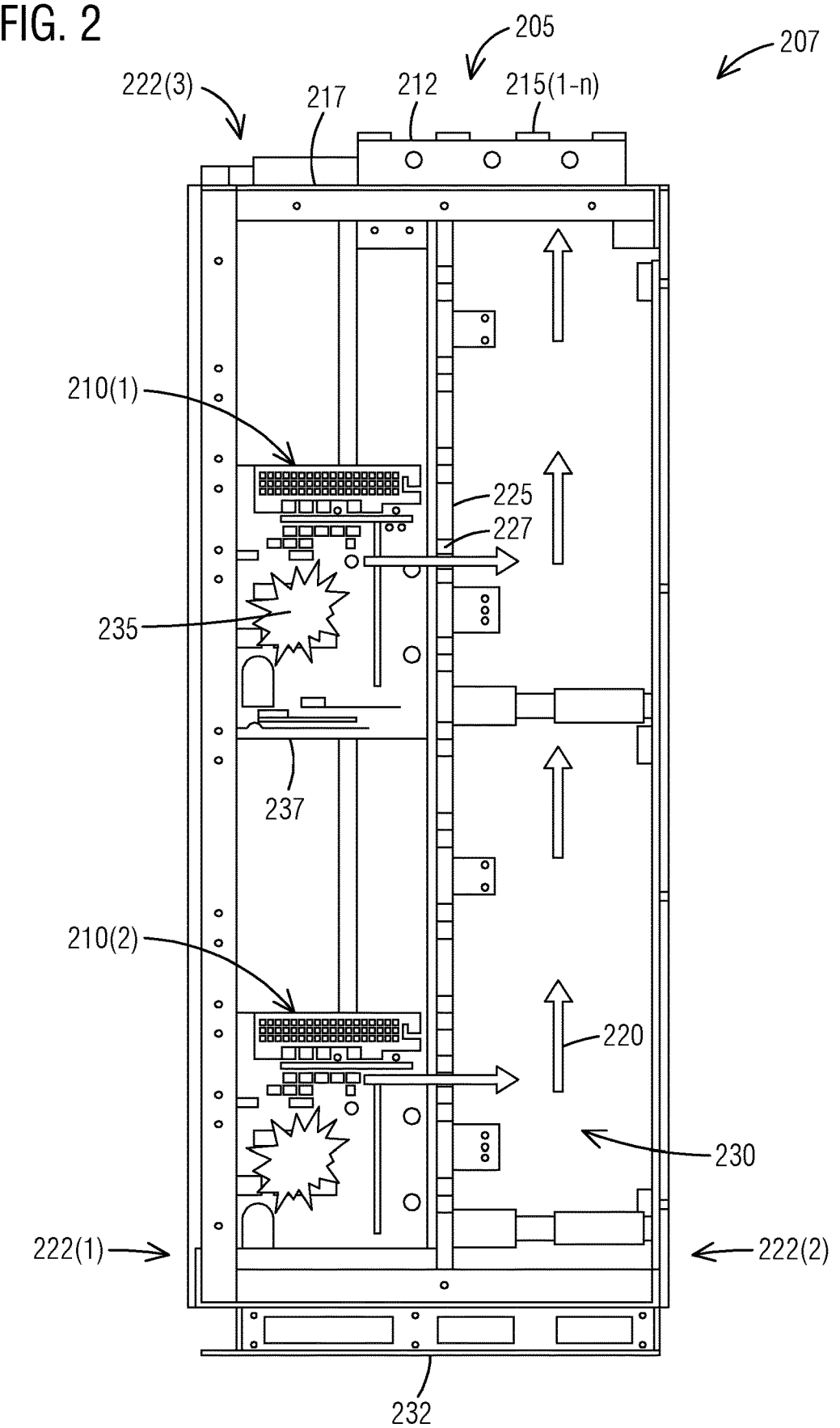
FIG. 2 illustrates a side circuit breaker section view of a front connected arc resistant switchgear having two circuit breaker compartments in accordance with an exemplary embodiment of the present invention.

Referring to FIG. 2, it illustrates a side view of a circuit breaker section 205 of a front connected arc resistant switchgear 207 having two circuit breaker compartments 210(1-2) in accordance with an exemplary embodiment of the present invention. The circuit breaker section 205 includes an arc flash vent stack 212 having a plurality of blow open flaps 215(1-n) disposed on a switchgear roof 217 to exhaust arc fault products 220 including arc flash gases and contaminants away from a front 222(1) of the circuit breaker section 205, towards a rear 222(2) of the circuit breaker section 205 and a top 222(3) of the circuit breaker section 205. The circuit breaker section 205 includes a circuit breaker compartment 210(1) having a back wall 225 forming a back of the circuit breaker compartment 210(1). The circuit breaker section 205 includes a back vent opening 227 formed in the back wall 225 for the passage of all the arc fault products 220 including arc flash gases and contaminants. The circuit breaker section 205 includes a bus compartment 230. All of the arc fault products 220 including arc flash gases and contaminants pass through the back vent opening 227 in the circuit breaker compartment 210(1) and into the bus compartment 230. The bus compartment 230 forms a single pathway for channeling all of the arc fault products 220 including arc flash gases and contaminants to the arc flash vent stack 212. The circuit breaker section 205 further includes a mounting base 232.

An electric arc flash 235 is shown in a circuit breaker 237. The arc fault products 220 including arc flash gases and contaminants from the electric arc flash 235 expand and exit the circuit breaker compartment 210(1) and enter the bus compartment 230. The arc fault products 220 including arc flash gases and contaminants are channeled through the bus compartment 230 to the circuit breaker section 210(1)'s vent stack 212 on the switchgear roof 217.

In one embodiment, the arc flash vent stack 212 is located in a cover of a switchgear assembly of a front connected switchgear. The blow open flaps 215(1-n) of the arc flash vent stack 212 are configured to be closed under normal operating conditions. The blow open flaps 215(1-n) of the arc flash vent stack 212 are integral to the arc flash vent stack 212. The blow open flaps 215(1-n) of the arc flash vent stack 212 are configured to open under arc fault conditions.

Figure 3:
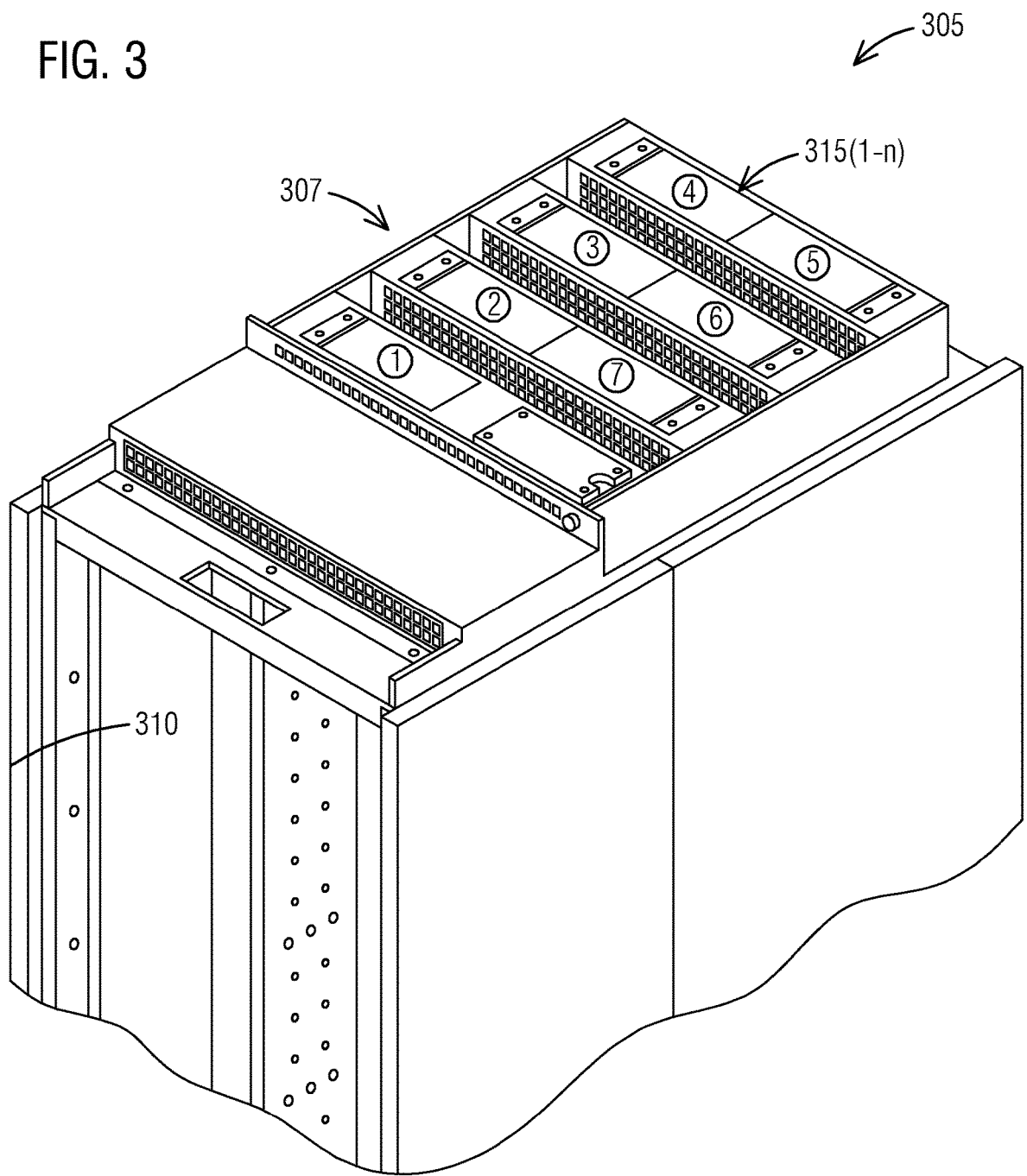
FIG. 3 illustrates a top isometric view of a front connected arc resistant switchgear including a vent stack over a circuit breaker section in that blow open flaps/pressure flaps are closed under normal operating conditions in accordance with an exemplary embodiment of the present invention.

Turning now to FIG. 3, it illustrates a top isometric view of a front connected arc resistant switchgear 305 including a vent stack 307 over a circuit breaker section 310 in that a plurality of blow open flaps/pressure flaps 315(1-n) are closed under normal operating conditions in accordance with an exemplary embodiment of the present invention. The plurality of blow open flaps/pressure flaps 315(1-n) get closed themselves under normal operating conditions. In other words, these do not require external force and automatically close due to its own weight. The plurality of blow open flaps/pressure flaps 315(1-n) are made thin to operate readily and shaped in a rectangular shape. The plurality of blow open flaps/pressure flaps 315(1-n) are movably hinged on one side to flip open and close between two states of operation. The plurality of blow open flaps/pressure flaps 315(1-n) are configured in opposing pair of flaps in a row of pairs extending from the front to back of the circuit breaker section 310 on a flat plane.

Figure 4:
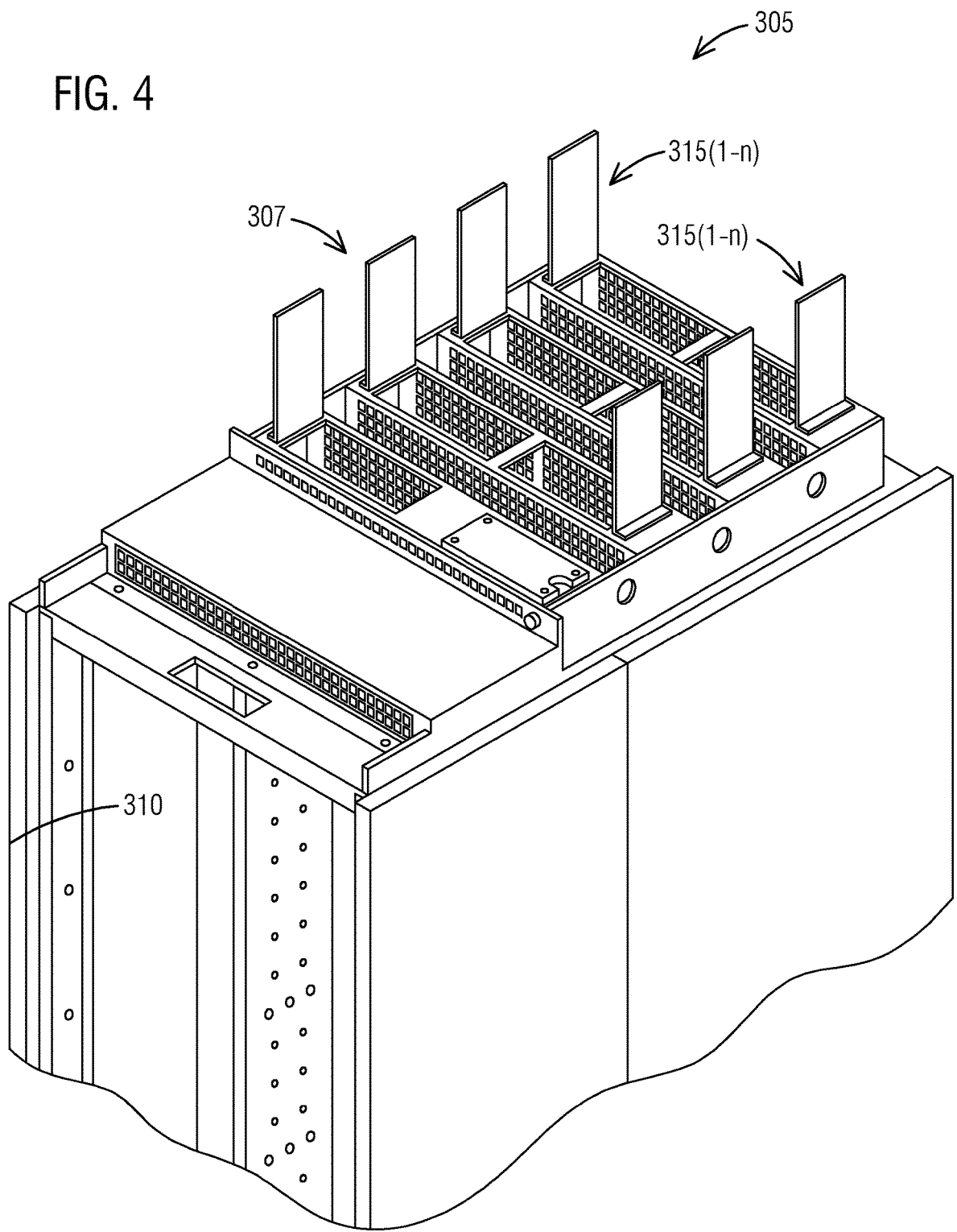
FIG. 4 illustrates a top isometric view of a front connected arc resistant switchgear including a vent stack over a circuit breaker section in that blow open flaps/pressure flaps are opened under arc fault conditions in accordance with an exemplary embodiment of the present invention.

FIG. 4 illustrates a top isometric view of the front connected arc resistant switchgear 305 including the vent stack 307 over the circuit breaker section 310 in that the plurality of blow open flaps/pressure flaps 315(1-n) are opened under arc fault conditions in accordance with an exemplary embodiment of the present invention. The plurality of blow open flaps/pressure flaps 315(1-n) are configured to have a light weight so that they can be lifted up in an open state from a close state.

Figure 5:
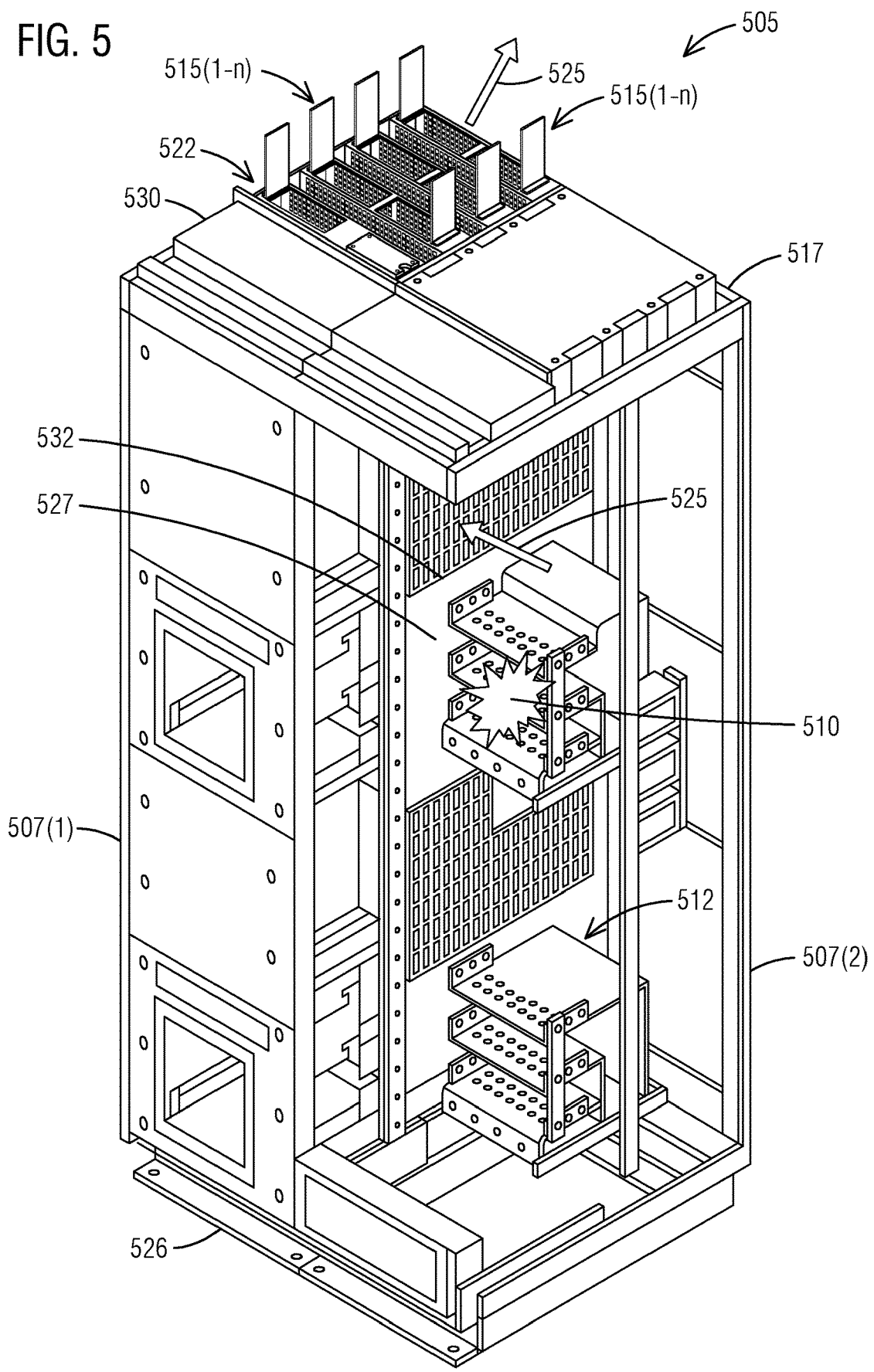
FIG. 5 illustrates a perspective view of a front connected switchgear assembly consisting of multiple switchgear sections including a circuit breaker section and a cable section with an electric arc flash shown on lug pads of the cable section while blow open flaps/pressure flaps are opened in accordance with an exemplary embodiment of the present invention.

As seen in FIG. 5, it illustrates a perspective view of a front connected switchgear assembly 505 consisting of multiple switchgear sections including a circuit breaker section 507(1) and a cable section 507(2) with an electric arc flash 510 shown on lug pads 512 of the cable section 507(2) while a plurality of blow open flaps/pressure flaps 515(1-n) are opened in accordance with an exemplary embodiment of the present invention. The front connected switchgear assembly 505 comprises the circuit breaker section 507(1) having a switchgear roof 517, a bus compartment 230, 705, a front, a rear and a top. The circuit breaker section 507(1) includes an arc flash vent stack 522 having the plurality of blow open flaps/pressure flaps 515(1-n) disposed on the switchgear roof 517 to exhaust arc flash gases and contaminants 525 away from the front connected switchgear assembly 505. The circuit breaker section 507(1) further includes a mounting base 526.

The front connected switchgear assembly 505 comprises the cable section 507(2) having a side wall 527 and a top 530. The cable section 507(2) includes one or more lug pads 512. The cable section 507(2) includes a side vent panel 532 formed in the side wall 527 for the passage of all the arc flash gases and contaminants 525. All of the arc flash gases and contaminants 525 pass through the side vent panel 532 in the side wall 527 of the cable section 507(2) and into the bus compartment 230, 705. The bus compartment 230, 705 forms a single pathway for channeling all of the arc flash gases and contaminants 525 to the arc flash vent stack 522.

The plurality of blow open flaps/pressure flaps 515(1-n) of the arc flash vent stack 522 are configured to blow open to relieve pressure from all the arc flash gases and contaminants 525. The arc flash vent stack 522 is located in a cover of the switchgear assembly 505. The plurality of blow open flaps/pressure flaps 515(1-n) of the arc flash vent stack 522 are configured to be closed under normal operating conditions. The plurality of blow open flaps/pressure flaps 515(1-n) of the arc flash vent stack 522 are integral to the arc flash vent stack 522. The plurality of blow open flaps/pressure flaps 515(1-n) of the arc flash vent stack 522 are configured to open under arc fault conditions.

Figure 6:
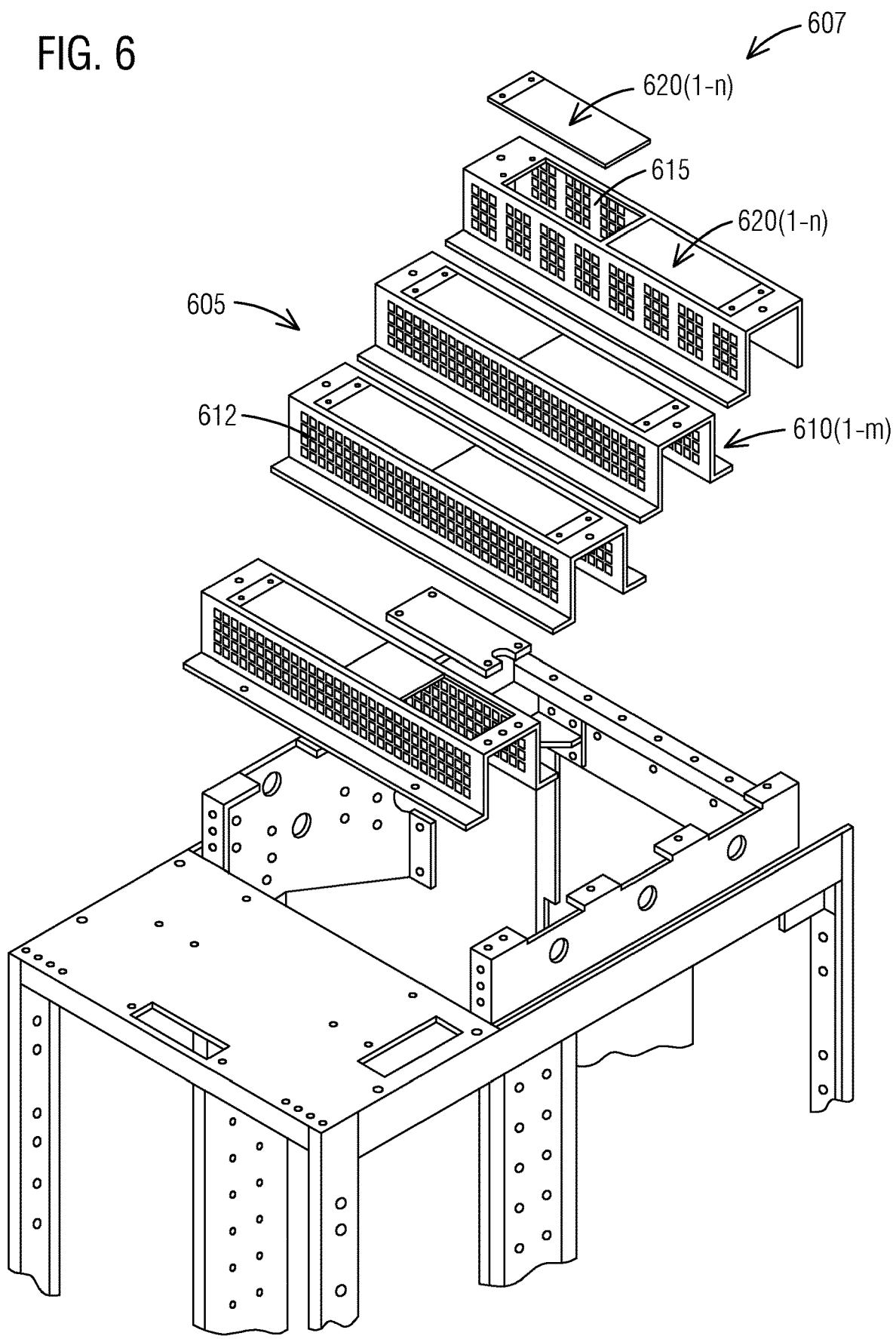
FIG. 6 illustrates an exploded view of the vent stack of the circuit breaker section in accordance with an exemplary embodiment of the present invention.

As shown in FIG. 6, it illustrates an exploded view of an arc flash vent stack 605 of a circuit breaker section 607 in accordance with an exemplary embodiment of the present invention. The arc flash vent stack 605 comprises a plurality of vent brackets 610(1-*m*) with side mesh openings 612 and top openings 615 with a plurality of blow open flaps/pressure flaps 620(1-*n*) being mounted over the top openings 615. The plurality of blow open flaps/pressure flaps 620(1-*n*) are movably hinged to the plurality of vent brackets 610(1-*m*) of the arc flash vent stack 605.

Figure 7:
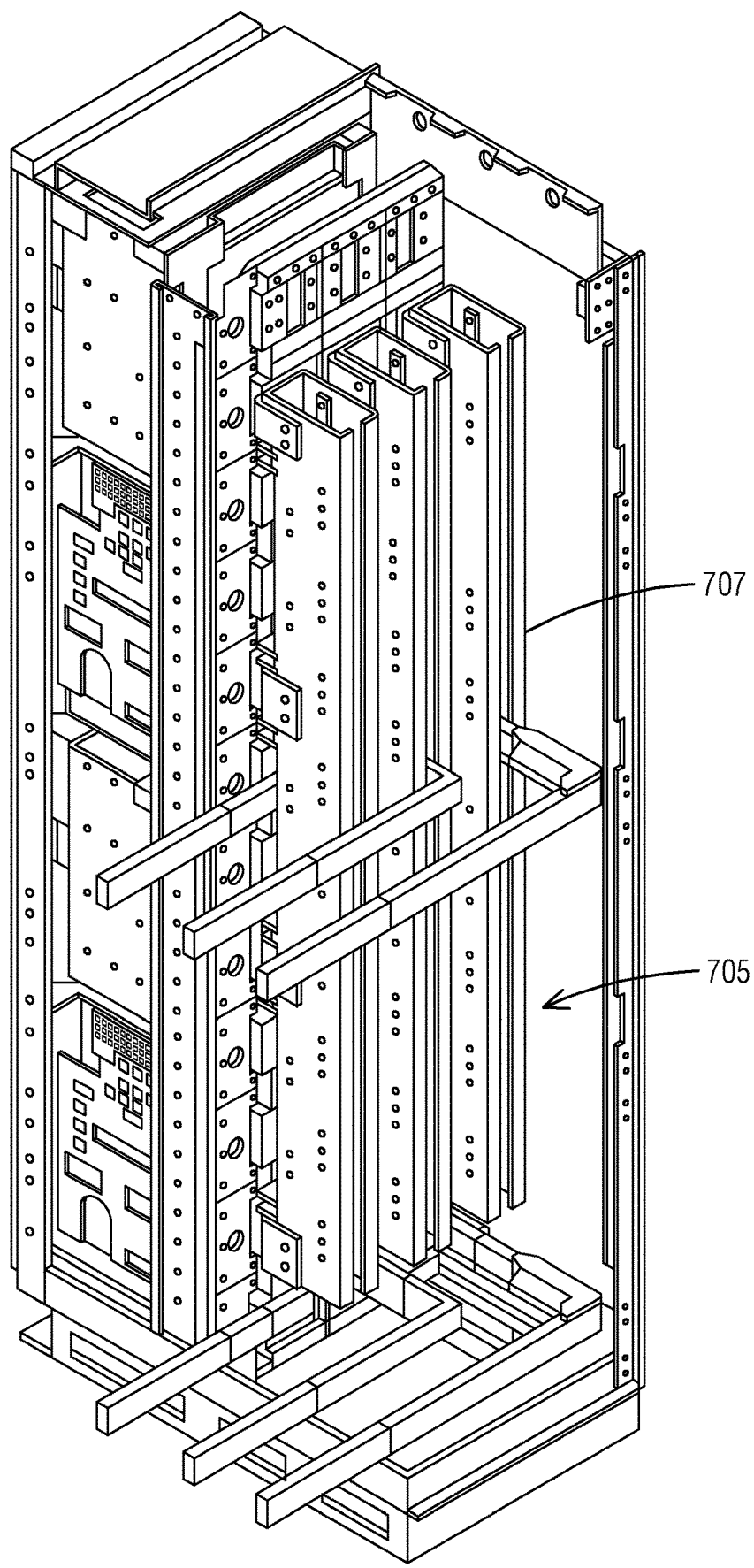
FIG. 7 illustrates an isometric view of a bus compartment with a vertical bus without an insulation and the vent stack in accordance with an exemplary embodiment of the present invention.

In FIG. 7, it illustrates an isometric view of a bus compartment 705 with a vertical bus 707 without an insulation and the vent stack in accordance with an exemplary embodiment of the present invention. The vertical bus 707 has isolation barriers (not shown) which forms a pathway. The vertical bus 707 shown is a full length bus, however, there are other configurations where the vertical bus 707 will be of lesser lengths. The bus compartment 705 includes the vertical bus 707 with insulation and the empty space between the vertical bus 707 and the rear covers (see FIG. 2) in that both of them form a pathway to the vent stack.

While a front connected switchgear is described here a range of one or more other switchgears or other forms of switchgears are also contemplated by the present invention. For example, other types of switchgears may be implemented based on one or more features presented above without deviating from the spirit of the present invention.

The techniques described herein can be particularly useful for low voltage switchgears and switchboards. While particular embodiments are described in terms of a low voltage switchgear, the techniques described herein are not limited to such a structure but can also be used with other switchgears and switchboards.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A switchgear assembly having an integrated arc flash venting system, comprising:
    a circuit breaker section having a switchgear roof, a front, a rear and a top, wherein the circuit breaker section including:
        an arc flash vent stack having blow open flaps disposed on the switchgear roof to exhaust arc flash gases and contaminants away from the front of the circuit breaker section, towards the rear of the circuit breaker section and the top of the circuit breaker section,
        a circuit breaker compartment having a back wall forming a back of the circuit breaker compartment,
        a back vent opening formed in the back wall for the passage of all the arc flash gases and contaminants, and
        a bus compartment, wherein all of the arc flash gases and contaminants pass through the back vent opening in the circuit breaker compartment and into the bus compartment wherein the bus compartment forms a single pathway for channeling all of the arc flash gases and contaminants to the arc flash vent stack; and
    a cable section having a side wall and a top, wherein the cable section including:
        one or more lug pads, and
        a side vent panel formed in the side wall for the passage of all the arc flash gases and contaminants,
        wherein all of the arc flash gases and contaminants pass through the side vent panel in the side wall of the cable section and into the bus compartment wherein the bus compartment forms a single pathway for channeling all of the arc flash gases and contaminants to the arc flash vent stack,
        wherein the cable section is situated on a side of the circuit breaker section such that a length of the cable section runs parallel to a length of the circuit breaker section running from the front and the rear of the circuit breaker section.

2. The switchgear assembly of claim 1, wherein the blow open flaps of the arc flash vent stack are configured to blow open to relieve pressure from all the arc flash gases and contaminants.

3. The switchgear assembly of claim 1, wherein the blow open flaps of the arc flash vent stack are configured to be closed under normal operating conditions.

4. The switchgear assembly of claim 1, wherein the blow open flaps of the arc flash vent stack are integral to the arc flash vent stack.

5. The switchgear assembly of claim 1, wherein the blow open flaps of the arc flash vent stack are configured to open under arc fault conditions.

6. The switchgear assembly of claim 5, wherein the arc flash vent stack comprises a plurality of vent brackets with side mesh openings and top openings with the blow open flaps being mounted over the top openings.

7. The switchgear assembly of claim 6, wherein the blow open flaps are movably hinged to the plurality of vent brackets of the arc flash vent stack.

8. The switchgear assembly of claim 1, wherein the circuit breaker section further comprising:
    a mounting base, wherein the switchgear assembly is a front connected switchgear.

9. A method of providing a switchgear assembly having an integrated arc flash venting system, the method comprising:
    providing a circuit breaker section having a switchgear roof, a front, a rear and a top, wherein the circuit breaker section including:
        an arc flash vent stack having blow open flaps disposed on the switchgear roof to exhaust arc flash gases and contaminants away from the front of the circuit breaker section, towards the rear of the circuit breaker section and the top of the circuit breaker section,
        a circuit breaker compartment having a back wall forming a back of the circuit breaker compartment,
        a back vent opening formed in the back wall for the passage of all the arc flash gases and contaminants, and
        a bus compartment, wherein all of the arc flash gases and contaminants pass through the back vent opening in the circuit breaker compartment and into the bus compartment wherein the bus compartment forms a single pathway for channeling all of the arc flash gases and contaminants to the arc flash vent stack; and
    providing a cable section having a side wall and a top, wherein the cable section including:
        one or more lug pads, and
        a side vent panel formed in the side wall for the passage of all the arc flash gases and contaminants,
        wherein all of the arc flash gases and contaminants pass through the side vent panel in the side wall of the cable section and into the bus compartment wherein the bus compartment forms a single pathway for channeling all of the arc flash gases and contaminants to the arc flash vent stack,
        wherein the cable section is situated on a side of the circuit breaker section such that a length of the cable section runs parallel to a length of the circuit breaker section running from the front and the rear of the circuit breaker section.

10. The method of claim 9, wherein the blow open flaps of the arc flash vent stack are configured to blow open to relieve pressure from all the arc flash gases and contaminants.

11. The method of claim 9, wherein the blow open flaps of the arc flash vent stack are configured to be closed under normal operating conditions.

12. The method of claim 9, wherein the blow open flaps of the arc flash vent stack are integral to the arc flash vent stack.

13. The method of claim 9, wherein the blow open flaps of the arc flash vent stack are configured to open under arc fault conditions.

14. The method of claim 13, wherein the arc flash vent stack comprises a plurality of vent brackets with side mesh openings and top openings with the blow open flaps being mounted over the top openings.

15. The method of claim 14, wherein the blow open flaps are movably hinged to the plurality of vent brackets of the arc flash vent stack.

16. The method of claim 9, wherein the circuit breaker section further comprising:

a mounting base, wherein the switchgear assembly is a front connected switchgear.

\* \* \* \* \*